(12) United States Patent
Schmitt et al.

(10) Patent No.: US 8,914,210 B2
(45) Date of Patent: Dec. 16, 2014

(54) DEVICE FOR GENERATING AN ADDITIONAL RESET FORCE ON A GAS PEDAL AND METHOD FOR THE OPERATION THEREOF

(75) Inventors: Gregor Schmitt, Regensburg (DE); Frank Drews, Röthenbach (DE); Andreas Zell, Nürnberg (DE); Thorsten Gerbig, Regensburg (DE)

(73) Assignees: Continental Engineering Services GmbH (DE); Conti Temic Microelectronic GmbH (DE)

( * ) Notice: Subject to any disclaimer, the term of this patent is extended or adjusted under 35 U.S.C. 154(b) by 224 days.

(21) Appl. No.: 13/515,051

(22) PCT Filed: Nov. 3, 2010

(86) PCT No.: PCT/EP2010/066687
§ 371 (c)(1),
(2), (4) Date: Jul. 19, 2012

(87) PCT Pub. No.: WO2011/072943
PCT Pub. Date: Jun. 23, 2011

(65) Prior Publication Data
US 2012/0279347 A1 Nov. 8, 2012

(30) Foreign Application Priority Data
Dec. 15, 2009 (DE) .......................... 10 2009 054 650

(51) Int. Cl.
*G05G 1/30* (2008.04)
*G06F 17/00* (2006.01)
*F16H 63/42* (2006.01)
*G05G 5/03* (2008.04)
*B60K 26/02* (2006.01)

(52) U.S. Cl.
CPC .................. *G06G 1/30* (2013.01); *F16H 63/42* (2013.01); *F16H 2063/426* (2013.01); *G05G 5/03* (2013.01); *B60K 26/021* (2013.01)
USPC .................. 701/64; 701/51; 74/513; 74/560

(58) Field of Classification Search
CPC ........... G05G 1/30; G05G 1/38; B60K 26/021
USPC .......................................................... 74/513
See application file for complete search history.

(56) References Cited

U.S. PATENT DOCUMENTS 4,598,806 A * 7/1986 Sakakiyama .................. 477/174
4,998,520 A * 3/1991 Wright ........................... 123/399

(Continued)

FOREIGN PATENT DOCUMENTS

DE     32 32 160 A1    3/1984
DE     101 22 162 A1   11/2002

(Continued)

OTHER PUBLICATIONS

International Search Report for PCT International Application No. PCT/EP2010/066687 mailed Feb. 16, 2011.

(Continued)

*Primary Examiner* — James Trammell
*Assistant Examiner* — Demetra Smith-Stewart
(74) *Attorney, Agent, or Firm* — RatnerPrestia

(57) ABSTRACT

A device for generating an additional reset force on the gas pedal for motor vehicles, wherein a position change of the gas pedal relative to the initial position thereof, induced by a corresponding actuating force, against a reset force leads to an increase in the motive power of the engine and, when there is a decrease in the actuating force, a reset force moves the gas pedal back in the direction of the initial position thereof, and wherein an actuator is provided, which applies an additional reset force that acts in the reset direction of the gas pedal, and wherein the motor vehicle has a unit for determining the shifting point of a manually shifted transmission. Moreover, the invention relates to a method for operating the device according to the invention.

18 Claims, 4 Drawing Sheets

(56) References Cited

U.S. PATENT DOCUMENTS

| | | | |
|---|---|---|---|
| 5,568,797 A * | 10/1996 | Landerretche | 123/396 |
| 6,295,891 B1 * | 10/2001 | Velte et al. | 74/513 |
| 7,770,491 B2 * | 8/2010 | Ritter et al. | 74/560 |
| 2004/0259687 A1 * | 12/2004 | Ritter et al. | 477/187 |
| 2007/0000345 A1 * | 1/2007 | Leone | 74/513 |
| 2009/0030528 A1 * | 1/2009 | Evans et al. | 623/23.76 |
| 2009/0030582 A1 | 1/2009 | Jacobi et al. | |
| 2010/0037726 A1 * | 2/2010 | Beck | 74/514 |
| 2012/0167708 A1 * | 7/2012 | Brandt et al. | 74/513 |
| 2013/0091977 A1 * | 4/2013 | Fukushima et al. | 74/513 |
| 2013/0186229 A1 * | 7/2013 | Drews et al. | 74/513 |

FOREIGN PATENT DOCUMENTS

| | | | |
|---|---|---|---|
| DE | 10122162 A1 * | 11/2002 | |
| DE | 102 10 130 A1 | 9/2003 | |
| DE | 102 50 456 A1 | 2/2004 | |
| DE | 10 2004 002 114 A1 | 8/2005 | |
| DE | 10 2004 002 179 A1 | 8/2005 | |
| DE | 10 2004 024 763 A1 | 12/2005 | |
| DE | 10 2004 026 407 A1 | 12/2005 | |
| DE | 10 2007 032 722 A1 | 2/2008 | |
| DE | 10 2007 008 275 A1 | 8/2008 | |
| DE | 10 2008 060 502 A1 | 6/2009 | |
| DE | 10 2008 064 023 A1 | 9/2009 | |
| EP | 1 534 554 B1 | 6/2005 | |
| EP | 2 056 073 A2 | 5/2009 | |
| WO | WO 2007/073828 A1 | 7/2007 | |

OTHER PUBLICATIONS

German Search Report for DE 10 2009 054 650.2 mailed Sep. 29, 2010.

* cited by examiner

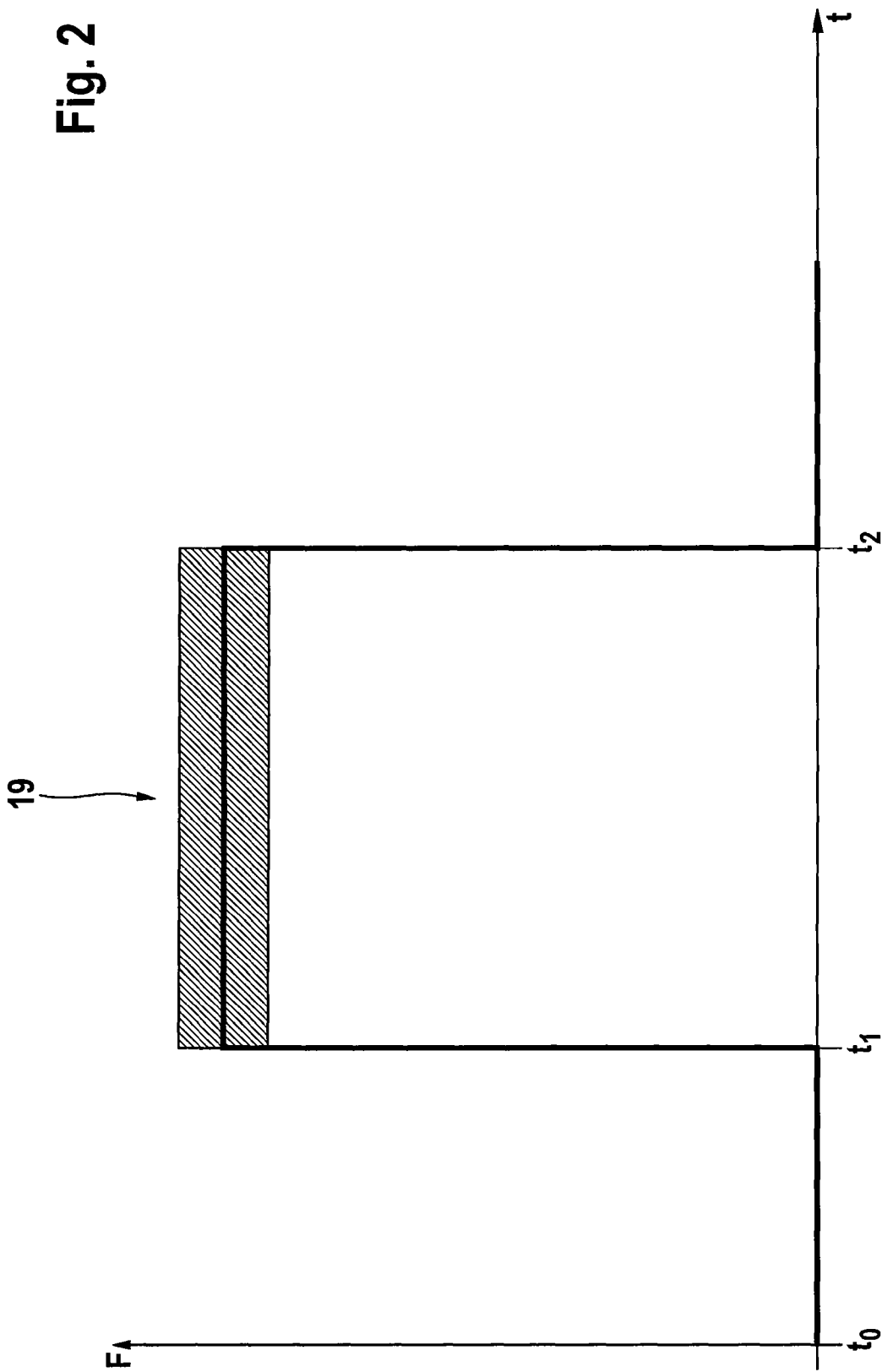

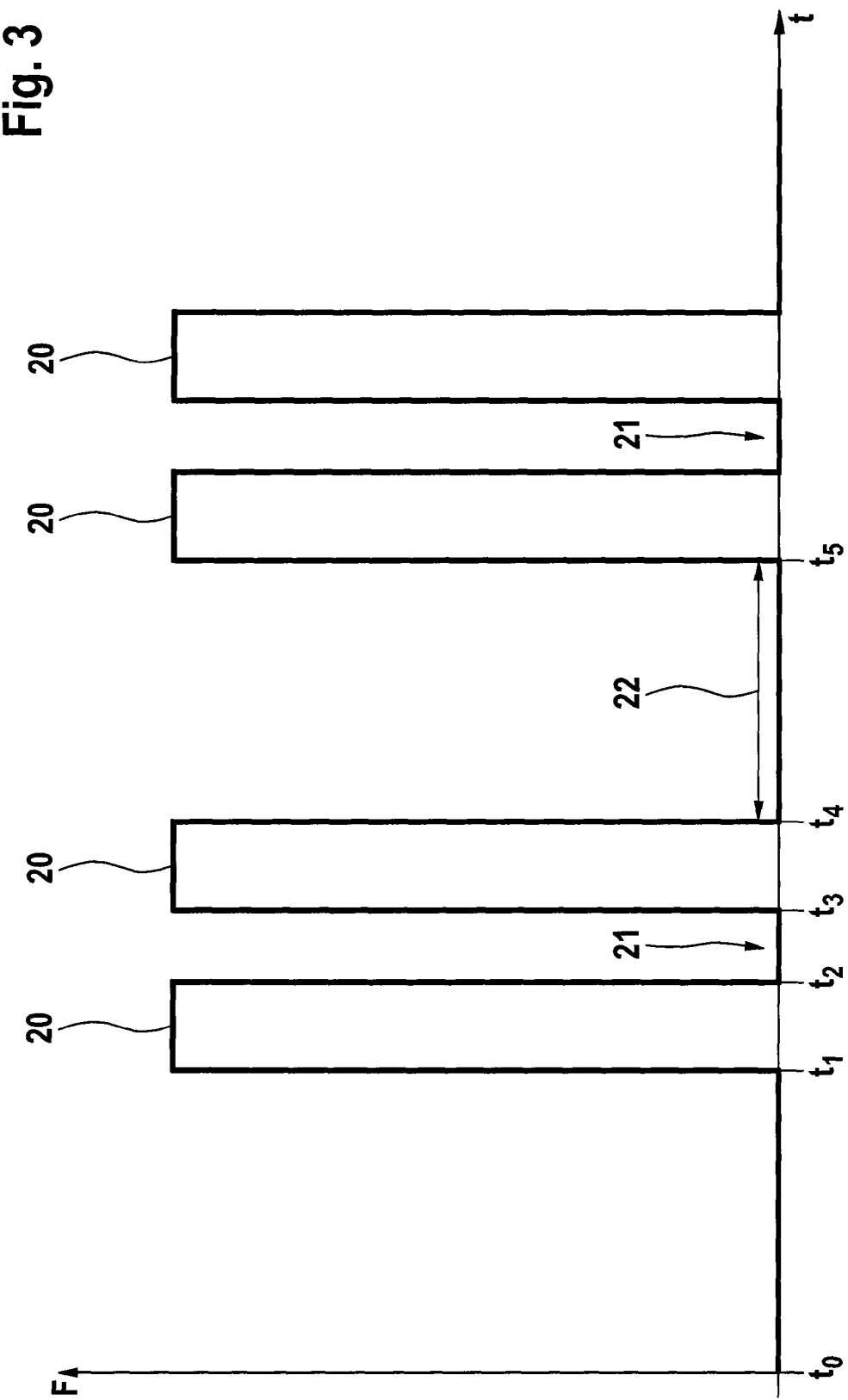

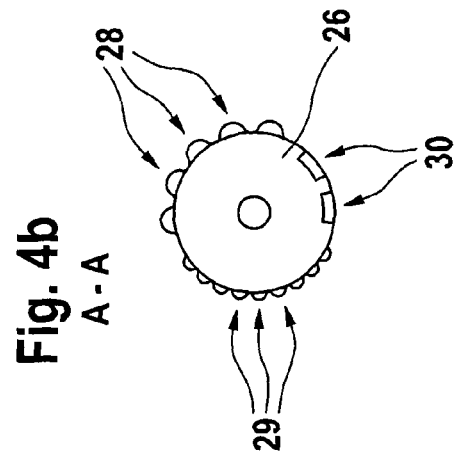
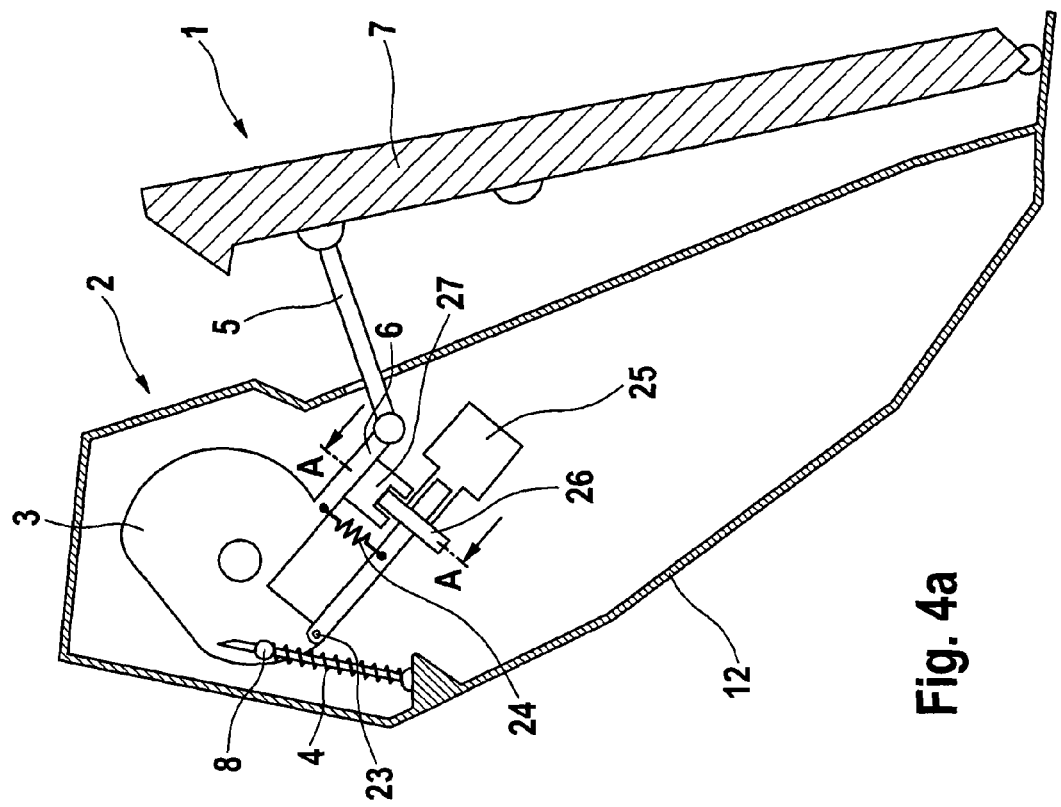

DEVICE FOR GENERATING AN ADDITIONAL RESET FORCE ON A GAS PEDAL AND METHOD FOR THE OPERATION THEREOF

CROSS REFERENCE TO RELATED APPLICATIONS

This application is the U.S. National Phase Application of PCT/EP2010/066687, filed Nov. 3, 2010, which claims priority to German Patent Application No. 10 2009 054 650.2, filed Dec. 15, 2009, the contents of such applications being incorporated by reference herein.

FIELD OF THE INVENTION

The present invention relates to a device for generating an additional reset force on the gas pedal for motor vehicles, wherein a position change of the gas pedal relative to the initial position thereof, induced by a corresponding actuating force, against a reset force leads to an increase in the motive power of the engine and, when there is a decrease in the actuating force, a reset force moves the gas pedal back in the direction of the initial position thereof, and wherein an actuator is provided, which applies an additional reset force that acts in the reset direction of the gas pedal, and wherein the motor vehicle has a unit for determining the shifting point of a manually shifted transmission. Moreover, the invention relates to a method for operating the device according to the invention.

BACKGROUND OF THE INVENTION

WO2007/073828 A1, which is incorporated by reference, has disclosed a shift point indicator in a motor vehicle with a manually shifted transmission for the purpose of giving a shift indication. In the previously known device, the shift indication is given in an indicator unit and is communicated visually to the vehicle driver. The problem with visual communication of this kind is that the vehicle driver can only perceive the shift indication if he takes his eyes off the traffic and looks at the indicator unit.

DE 32 32 160 A1, which is incorporated by reference, has therefore disclosed a method in which the reset force of the gas pedal can be modified and provides the vehicle driver with a haptic feedback. In the previously known method, information relating, for example, to the choice of gear, is communicated to the vehicle driver in the form of movements, e.g. vibrations, superimposed on the pedal travel. Owing to the large amount of information communicated to the vehicle driver, it is important that clear haptic information should be communicated to the vehicle driver.

BRIEF DESCRIPTION OF THE INVENTION

It is therefore an aim of the present invention to present a device and a method by means of which haptic information can be made available to the vehicle driver in as clear and unambiguous a way as possible.

This is achieved by a method for operating a device for generating an additional reset force on the gas pedal for motor vehicles, wherein a position change of the gas pedal relative to the initial position thereof, induced by a corresponding actuating force, against a reset force leads to an increase in the motive power of the engine and, when there is a decrease in the actuating force, a reset force moves the gas pedal back in the direction of the initial position thereof, and wherein an actuator is provided, which applies an additional reset force that acts in the reset direction of the gas pedal, and wherein the motor vehicle has a unit for determining the shifting point of a manually shifted transmission, wherein the reset force is applied in the form of a rectangular force pulse in order to suggest a gear change of the manually shifted transmission to the vehicle driver. Here, the reset force is applied in the form of a rectangular force pulse in order to suggest a gear change of the manually shifted transmission to the vehicle driver.

Advantageous developments can be found in the dependent claims.

Thus, in a preferred development of the method according to an aspect of the invention, the reset force is implemented in the form of two rectangular force pulses in quick succession. Here, provision is made for a rectangular force pulse to be applied if the vehicle driver is supposed to perform a gear change to a lower gear. The vehicle driver feels this individual rectangular force pulse as a "single nudge" on the gas pedal. Moreover, provision is made for two rectangular force pulses to be applied if the vehicle driver is supposed to perform a gear change to a higher gear. The vehicle driver perceives these two rectangular force pulses as a "double nudge" on the gas pedal.

The two rectangular force pulses in quick succession and the intervening pause have a total duration of 150 to 200 ms, preferably 180 ms. It has been found that this type of double nudge is, on the one hand, detected particularly well by the driver and, on the other hand, does not have a disturbing effect.

In a particularly advantageous development of the method proposed, provision is made for the force pulse to be applied repeatedly if the vehicle driver does not perform a gear change of the manually shifted transmission.

In order to remind the vehicle driver of a gear change request which has been ignored, the ratio of the force pulse to the intervening pause and/or the amplitude of the force pulse can be modified. The time interval between the repeated application of two force pulses can also be modified.

Another advantageous development of the method according to an aspect of the invention envisages that the application of a reset force to request a gear change is suppressed if there is a situation critical in terms of vehicle dynamics or the traffic situation requires it. The situation is critical in terms of vehicle dynamics when the vehicle is being subjected to a high transverse acceleration or when an electronic stability control system is active.

In a particularly advantageous development, an adaptive learning algorithm is provided, which determines the response of the vehicle driver to the application of a reset force.

According to an aspect of the invention, the present aim is also achieved by providing means which apply the reset force in the form of a rectangular force pulse. Here, provision is made for the means to be implemented by a profiled shaft, the contour of which interacts with a counterbearing, which is connected in a force-transmitting manner to the pedal plate. The profiled shaft can be driven in rotation by an electric motor.

The force-transmitting connection is implemented by means of a turning lever and of a coupler lever, wherein the profiled shaft acts on the turning lever by means of a turning movement via the counterbearing. Here, provision is made for the turning movement of the profiled shaft to transmit a pulse to the turning lever. By this means, the turning lever is actuated in such a way that the additional reset force takes the form of a force modulation at the gas pedal.

In an alternative embodiment, by contrast, provision is made for the turning movement of the profiled shaft to excite the turning lever by way of structure borne noise absorption. The structure borne noise propagates via the coupler lever and imparts to the pedal plate a vibration which corresponds to the additional reset force in the form of a force modulation.

A particularly advantageous development of the subject matter of the invention envisages that the contour of the profiled shaft is of undulating design or has grooves. By means of this measure, it is possible to produce the additional reset force in the form of a rectangular force pulse.

A tension spring is provided, which holds the profiled shaft in engagement with the counterbearing.

BRIEF DESCRIPTION OF THE DRAWINGS

The invention is best understood from the following detailed description when read in connection with the accompanying drawing. Included in the drawing is the following figure:

FIG. 2 shows a diagram of the additional reset force F in the reset direction according to the prior art;

FIG. 3 shows a diagram of the additional reset force F in the reset direction for communicating a gear change request to the vehicle driver in accordance with the method according to the invention;

FIG. 4a shows another device for generating an additional reset force on the gas pedal, and FIG. 4b shows a sectional representation of a profiled shaft which can be used in the device shown in FIG. 4a.

DETAILED DESCRIPTION OF THE PREFERRED EMBODIMENTS

Figure 1:
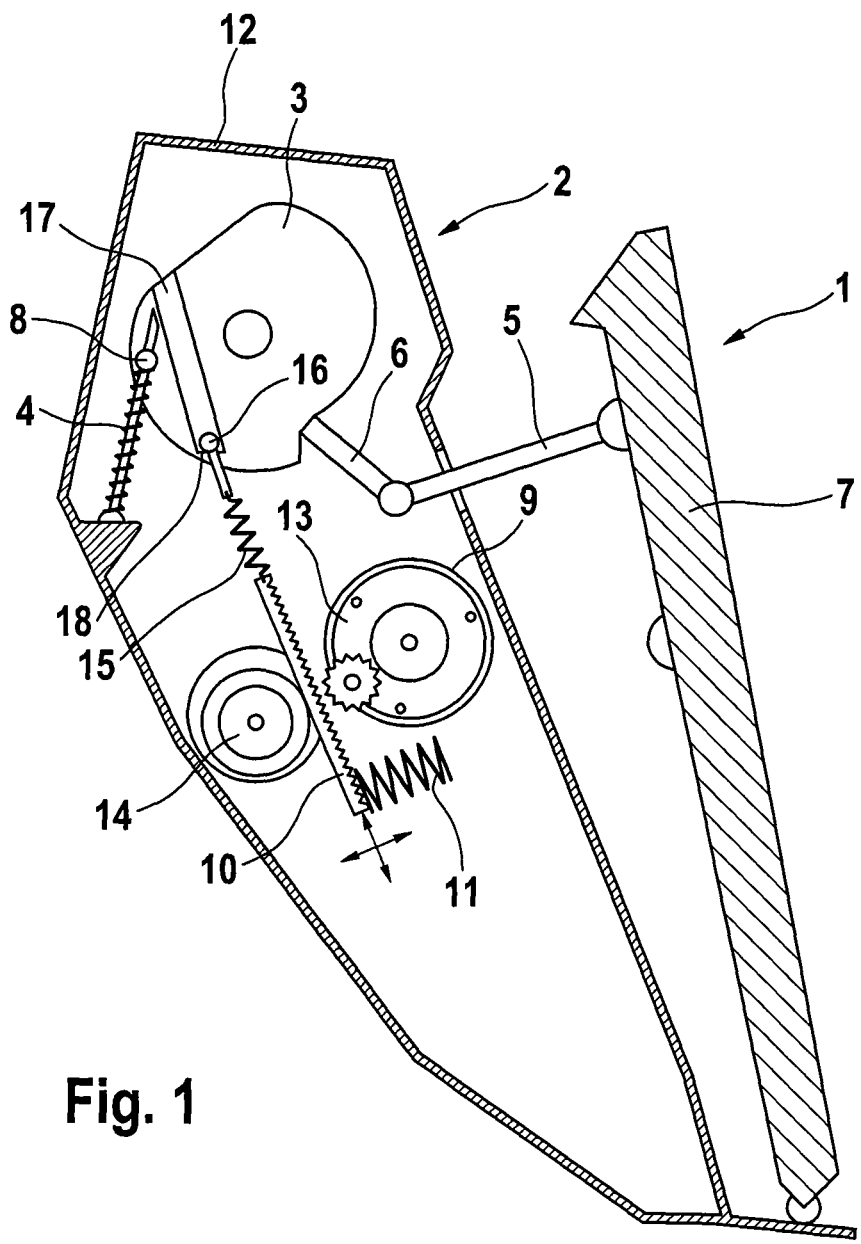
FIG. 1 shows a device for generating an additional reset force on the gas pedal.

FIG. 1 shows a device for generating an additional reset force on the gas pedal 1 for motor vehicles. When the vehicle driver steps on the gas pedal 1 and a position change of the gas pedal 1 relative to the initial position occurs, induced by his corresponding foot actuating force, against a reset force, this leads to an increase in the motive power of the engine. When the vehicle driver takes his foot off the gas pedal 1, a reset force moves the gas pedal 1 back in the direction of the initial position thereof. As will be explained in greater detail below, an actuator 2 applies an additional reset force F that acts in the reset direction of the gas pedal 1.

As is illustrated in detail in FIG. 1, a pedal plate 7 is pivotably mounted on a housing 12 of a pedal module. A cam disk 3 is arranged pivotably in the housing 12. Engaging on the pedal plate 7 is a coupler lever 5, which interacts with a turning lever 6 firmly connected to the cam disk 3. It will be seen that, when the pedal plate 7 performs a counterclockwise pivoting movement, the cam disk 3 is turned clockwise. Engaging on the cam disk 3, at an attachment point 8, is a reset spring 4, which applies a reset force and is also referred to as a return spring or restoring spring. With the aid of a sensor (not shown), the extent of the pivoting movement of the cam disk 3 is determined, this being a measure of the actuating travel s of the gas pedal 1. The motive power of the engine of the motor vehicle is regulated in accordance with the actuating travel s of the gas pedal 1, and the pivoting of the pedal plate 7 counterclockwise leads to an increase in the motive power of the engine. If the force exerted on the pedal plate 7 is reduced, the reset spring 4 can contract and hence push the pedal plate 7 back.

Starting from this design, which is known per se, the structure illustrated in FIG. 1 then ensures that an electric motor 9 with a gear 13 connected thereto exerts a reset force on the pedal plate 7, which is added to the reset force of the reset spring 4.

In the initial state, there is no engagement between the motor/gear unit 9, 13 and a restoring rod 10, which is pushed to the left in FIG. 1, out of engagement with the motor/gear unit 9, 13, by a retaining spring 11. If the "force feedback function" is added in order to generate the additional reset force F, the restoring rod 10 is pushed in the direction of the motor/gear unit 9, 13 by an actuator (not shown specifically) with the connected eccentric 14, and the restoring rod 10 and the motor/gear unit 9, 13 enter into engagement. The cam disk 3 is then pulled back downward in FIG. 1 by the motor/gear unit 9, 13, and hence an additional reset force F is generated. To enable the system to be overridden in the event of failure of the motor/gear unit 9, 13 or of the actuator for actuating the eccentric 14, the connection between the restoring rod 10 and the cam disk 3 is established via a deflection spring 15. In this context, "overridden" means the following. The driver is provided with the possibility of pressing the pedal plate 7 further down in the counterclockwise direction against the force exerted by the restoring rod 10. The deflection spring 15 is inserted for this purpose between the cam disk 3 and the restoring rod 10. The mounting of the restoring rod 10 can deflect upward within the cam disk 3, and sudden acceleration due to a malfunction in the actuating unit 2 (due, for example, to an incorrect direction of rotation of the electric motor 9) is therefore avoided. For this purpose, the mounting 16 is guided in a groove 17 in such a way that it can engage on a wall 18 of the groove 17 and can turn the cam disk 3 counterclockwise by means of pulling forces. Pushing forces cannot be transmitted since the mounting 16 can deflect upward within the groove 18. Instead of the groove illustrated, it is also possible for the connection between the cam disk 3 and the restoring rod 10 to be established by means of a cable. All that needs to be ensured is that force transmission can take place in only one direction.

FIG. 2 shows a time characteristic of the additional reset force F, as known from the prior art. As already mentioned, the practice of communicating information relating to the choice of gear to the vehicle driver in the form of movements superimposed on the pedal travel, e.g. vibrations, is known from the prior art. It can be seen from the diagram in FIG. 2 that no additional reset force F is being applied at time $t_0$. At time $t_1$, an additional reset force F is suddenly applied and is modulated in such a way that, between time $t_1$ and $t_2$, a vibration 19 arises, which the vehicle driver feels at the pedal plate 7.

In tests with test subjects, it has been found that a reset force F in the form of rectangular force pulses 20 of the kind illustrated in FIG. 3 is particularly suitable for detection by the vehicle driver. Moreover, different requests relating to the choice of gear can be communicated to the vehicle driver with the aid of the rectangular force pulses 20: two rectangular force pulses 20 are applied in quick succession if the vehicle driver is supposed to perform a gear change to a higher gear, whereas just one rectangular force pulse 20 is applied if the vehicle driver is supposed to perform a gear change to a lower gear. Thus, not only does the vehicle driver receive a gear change indication but also at the same time an indication of the direction in which the gear change is supposed to take place in terms of up or down shifting.

FIG. 3 shows respective pairs of force pulses 20 following one another in quick succession. The first force pulse 20 is applied at time $t_1$ and continues until time $t_2$. The magnitude of the force pulse 20 is between 5 N and 30 N. The duration of a force pulse 20 from time $t_1$ to time $t_2$ is preferably 30 ms. There is a pause 21 before the start of the second force pulse 20 at time $t_3$. A cycle thus described, consisting of two force pulses 20 and an intervening pause 21, has a total duration of 150 to 200 ms, preferably 180 ms. If the vehicle driver does not follow the gear change recommendation, two force pulses 20 in quick succession are once again applied at $t_5$. If the vehicle driver continues to disregard the request for a gear change, two more force pulses 20 are applied and, at the same time, the ratio of the force pulses 20 to the intervening pause 21 is modified, changing the subjective impression of the vehicle driver. Provision is likewise made to increase the amplitude and hence the intensity of the force pulse 20. This measure too is an effective way of attracting the attention of the vehicle driver. Another measure for increasing the attention of the vehicle driver is to modify the time interval 22 between the cycles consisting respectively of two force pulses 20 and an intervening pause 21.

If the vehicle is in a state which is critical in terms of vehicle dynamics or if the traffic situation or the state of the vehicle requires it, on the other hand, the vehicle driver should not be distracted, and the application of the force pulses 20 is suppressed in such a state. A state which is critical in terms of vehicle dynamics is present when a high transverse acceleration is acting on the motor vehicle or an electronic stability control system is active. A vehicle state in which the vehicle driver should not be distracted is present when other, higher-priority warnings need to be communicated to the vehicle driver, such as a request to put on the safety belt or a warning on the imminent exhaustion of fuel reserves. Suppression of the additional reset force F can also be dependent on position determination by a satellite navigation system (GPS). When accelerating on an entry lane of a freeway, for instance, the request for shifting up to a higher gear should be suppressed.

In order to draw the attention of the vehicle driver effectively to a recommended gear change, it is necessary to analyze the response of the vehicle driver in an adaptive learning algorithm. The adaptive learning algorithm determines the response of the vehicle driver to the additional reset force applied. Typical questions here are: how often does the vehicle driver follow a gear change recommendation and how often does the vehicle driver follow a gear change recommendation after being reminded by the repeated application of an additional reset force? What is the response time between the gear change request and the execution of the gear change?

On the basis of the response behavior of the vehicle driver, the adaptive learning algorithm improves the application of the additional reset force and modifies the ratio of the force pulse 20 to the pause 21 or the time period 22 to the repetition of a force pulse 20.

By virtue of an improved response of the vehicle driver to a request for a gear change, the internal combustion engine of the motor vehicle is always operated at an optimum efficiency and fuel consumption and hence $CO_2$ emissions are reduced.

FIG. 4a shows another device for generating a reset force on the gas pedal. Components which are identical to those in the device shown in FIG. 1 bear the same reference signs. A cam disk 3 is arranged pivotably in a housing 12. Engaging on the pedal plate 7 is a coupler lever 5, which interacts with a turning lever 6 firmly connected to the cam disk 3. When the pedal plate 7 performs a counterclockwise pivoting movement, the cam disk 3 turns clockwise. Attached to the cam disk 3, at an attachment point 8, is a reset spring 4, which applies a reset force. If the force exerted on the pedal plate 7 is reduced, the reset spring 4 can contract and hence push the pedal plate 7 back.

In the embodiment shown in FIG. 4a, a profiled shaft 26 is provided to generate a reset force, said profiled shaft being attached pivotally to the cam disk 3 with the aid of a joint 23 and being driven in rotation by an electric motor 25. The contour of the profiled shaft 26 is shown as a sectional representation in FIG. 4b and is of undulating design in two sections. The undulating design of the contour of the profiled shaft 26 causes vibration of greater or lesser intensity at the gas pedal 1, depending on the amplitude of the wave shape 28, 29 imposed. In another section of the profiled shaft, two grooves 30 are introduced, inducing a rectangular force pulse at the gas pedal 1, as will be explained in greater detail below.

The profiled shaft 26 or the contour 28, 29, 30, thereof which has just been described acts on a counterbearing 27, which is firmly connected to the coupler lever 6. The profiled shaft 26 is held in engagement with the counterbearing 27 with the aid of a tension spring 24. When the profiled shaft 26 is driven by the electric motor, the contour 28, 29, 30 of the profiled shaft 26 transmits a pulse to the turning lever 6. This pulse acts substantially perpendicularly on the turning lever 6 and causes a counterclockwise rotation of the cam disk 3. As a result, however, the coupler lever 5 and hence the pedal plate 7 are moved in a modulating fashion, and the vehicle driver feels a reset force F in the form of a force modulation at the gas pedal 1. If, for example, the electric motor 25 is just moving the contour of the two grooves 30 past the turning lever 6, the turning lever 6 receives two pulses. Between these two pulses, the turning lever 6 is pulled back again due to the action of the tension spring 24. The result that can be felt by the vehicle driver at the gas pedal 1 is two rectangular force pulses of the kind described with reference to FIG. 3.

As an alternative, provision is made for the turning movement of the profiled shaft to excite the turning lever 6 by way of structure borne noise absorption. The term "structure borne noise" refers to the noise which propagates in a solid body. Such structure borne noise propagates in wave form in the turning lever 5 and in the coupler lever 5 and ensures that the pedal plate 7 moves clockwise and counterclockwise. Owing to this movement, the vehicle driver feels a reset force F in the form of a force modulation at the gas pedal 1.

The embodiment described in FIGS. 4a and 4b requires few components to generate an additional reset force F and is particularly robust and, at the same time, capable of being produced at low cost, by virtue of its comparatively simple design.

The invention claimed is:

1. A method for operating a device for generating an additional reset force on a gas pedal for motor vehicles, the method comprising:
   applying a reset force in the form of a rectangular force pulse;
   wherein a position change of the gas pedal relative to an initial position thereof, induced by a corresponding actuating force, against a reset force leads to an increase in motive power of the engine and, when there is a decrease in the actuating force, the reset force moves the gas pedal back in the direction of the initial position thereof,
   providing an actuator, which applies an additional reset force that acts in a reset direction of the gas pedal,
   determining a shifting point of a manually shifted transmission, and
   applying the reset force in the form two rectangular force pulses in quick succession in order to suggest a gear change of the manually shifted transmission to a driver of the vehicle.

2. The method as claimed in claim 1, wherein the two rectangular force pulses in quick succession and an intervening pause have a total duration of 150 to 200 ms.

3. The method as claimed in claim 2, wherein the two rectangular force pulses in quick succession and the intervening pause have a total duration of 180 ms.

4. The method as claimed in claim 2, wherein a ratio of the force pulse to the intervening pause and the amplitude of the force pulse can be modified.

5. The method as claimed in claim 4, wherein a time interval between a repeated application of the two force pulses can be modified.

6. The method as claimed in claim 2, wherein the force pulse is applied repeatedly if the vehicle driver does not perform a gear change of the manually shifted transmission.

7. The method as claimed in claim 1, wherein a rectangular force pulse is applied if the vehicle driver is supposed to perform a gear change to a lower gear.

8. The method as claimed claim 1, wherein two rectangular force pulses are applied if the vehicle driver is supposed to perform a gear change to a higher gear.

9. The method as claimed in claim 1, wherein the application of a reset force to request a gear change is suppressed if there is a situation critical in terms of vehicle dynamics or the traffic situation requires it.

10. A method for operating a device for generating an additional reset force on a gas pedal for motor vehicles, wherein a position change of the gas pedal relative to an initial position thereof, induced by a corresponding actuating force, against a reset force leads to an increase in motive power of the engine and, when there is a decrease in the actuating force, the reset force moves the gas pedal back in the direction of the initial position thereof, providing an actuator, which applies an additional reset force that acts in a reset direction of the gas pedal, and determining a shifting point of a manually shifted transmission, applying the reset force in the form of a rectangular force pulse in order to suggest a gear change of the manually shifted transmission to a driver of the vehicle, and wherein an adaptive learning algorithm is provided, which determines the response of the vehicle driver to the application of the reset force.

11. A device for producing an additional reset force on a gas pedal for motor vehicles, comprising:

a gas pedal wherein a position change of the gas pedal relative to an initial position thereof, induced by a corresponding actuating force, against a reset force leads to an increase in motive power of the engine and, when there is a decrease in the actuating force, a reset force moves the gas pedal back in the direction of the initial position thereof, an actuator for applying an additional reset force that acts in a reset direction of the gas pedal, and means comprising adjacent grooves for applying the reset force in the form of two rectangular pulses in quick succession.

12. The device as claimed in claim 11, wherein the means are implemented by a profiled shaft, a contour of which interacts with a counterbearing, which is connected in a force-transmitting manner to the pedal plate.

13. The device as claimed in claim 12, wherein the force-transmitting connection is implemented by a turning lever and of a coupler lever, wherein the profiled shaft acts on the turning lever by means of a turning movement via the counterbearing.

14. The device as claimed in claim 13, wherein the turning movement of the profiled shaft actuates the turning lever in such a way that the additional reset force takes the form of a force modulation.

15. The device as claimed in claim 13, wherein the turning movement of the profiled shaft excites the turning lever by way of structure borne noise absorption and produces an additional reset force in the form of a force modulation at the gas pedal.

16. The device as claimed in claim 11, wherein the profiled shaft can be driven in rotation by an electric motor.

17. The device as claimed in claim 11, wherein a contour of the profiled shaft is at least one of an undulating design and has the grooves.

18. The device as claimed in claim 11, wherein a tension spring is provided, which holds the profiled shaft in engagement with a counterbearinq.

* * * * *